United States Patent
Uhle

(10) Patent No.: US 12,489,289 B2
(45) Date of Patent: Dec. 2, 2025

(54) CIRCUIT FOR INDUCTIVE POWER AND DATA TRANSMISSION WITH FEEDBACK PROTECTION

(71) Applicant: Endress+Hauser Conducta GmbH+Co. KG, Gerlingen (DE)

(72) Inventor: Jörg Uhle, Limbach-Oberfrohna (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 181 days.

(21) Appl. No.: 18/522,511

(22) Filed: Nov. 29, 2023

(65) Prior Publication Data

US 2024/0186787 A1 Jun. 6, 2024

(30) Foreign Application Priority Data

Dec. 6, 2022 (DE) ...................... 10 2022 132 381.1

(51) Int. Cl.
*H02H 9/04* (2006.01)
*H02H 1/00* (2006.01)

(52) U.S. Cl.
CPC ............ *H02H 9/04* (2013.01); *H02H 1/0007* (2013.01)

(58) Field of Classification Search
CPC ....... G06F 21/602; G08C 17/00; H01R 12/57; H01R 13/622; H01R 13/6625; H01R 13/6691; H02H 1/0007; H02H 9/008; H02H 9/04; H02H 9/042; H02J 13/00002; H04W 12/00; H04W 12/02; H04W 12/033; H04W 4/80

See application file for complete search history.

(56) References Cited

U.S. PATENT DOCUMENTS

| 2010/0061733 A1* | 3/2010 | Loechner ............ G05B 19/4185 398/128 |
| 2012/0250235 A1* | 10/2012 | Huang ................. G06F 13/4081 361/679.01 |
| 2016/0104979 A1* | 4/2016 | Korn .................... H01R 13/6625 439/620.21 |

FOREIGN PATENT DOCUMENTS

| DE | 102008029956 A1 | 12/2009 | |
| DE | 102013103627 A1 | 10/2014 | |
| DE | 102014110385 A1 | 1/2016 | |
| DE | 102018107132 A1 | 9/2019 | |
| DE | 102018127779 A1 * | 5/2020 | ............ G08C 17/02 |
| DE | 102011003978 B4 | 6/2020 | |
| DE | 102020134521 A1 * | 6/2022 | ............... H04Q 9/00 |

(Continued)

*Primary Examiner* — Danny Nguyen
*Assistant Examiner* — Nicolas Bellido
(74) *Attorney, Agent, or Firm* — Mark A. Logan; Endress+Hauser (USA) Holding, Inc.

(57) ABSTRACT

A regenerative limiting circuit for potentially explosive areas, for supplying energy to a sensor and for data communication with a sensor, has an input unit, a first limiting unit, a second limiting unit, a monitoring unit, a high-voltage unit, a node unit, and a reference potential. The input unit has first and second data line connections, a supply line connection, and a zero line connection, each for connecting a connection cable. The first limiting unit is connected to the first data line connection, the second limiting unit is connected to the second data line connection and has a resistor and a Zener diode, wherein the Zener diode connects through to the reference potential in each case in the event of an overvoltage. The monitoring unit is connected to the first limiting unit and the second limiting unit, and is suitable for evaluating data.

7 Claims, 1 Drawing Sheet

(56) References Cited

FOREIGN PATENT DOCUMENTS

DE 102021129604 A1 6/2022
JP 2004070709 A * 3/2004

* cited by examiner

CIRCUIT FOR INDUCTIVE POWER AND DATA TRANSMISSION WITH FEEDBACK PROTECTION

CROSS-REFERENCE TO RELATED APPLICATION

The present application is related to and claims the priority benefit of German Patent Application No. 10 2022 132 381.1, filed on Dec. 6, 2022, the entire contents of which are incorporated herein by reference.

TECHNICAL FIELD

The present disclosure relates to a regenerative limiting circuit for potentially explosive areas, for supplying energy to a sensor and for data communication with a sensor.

BACKGROUND

In analytical measurement technology, especially in the fields of water management, of environmental analysis, in industry, e.g., in food technology, biotechnology, and pharmaceutics, as well as for the most varied laboratory applications, measured variables, such as the pH, the conductivity, or even the concentration of analytes, such as ions or dissolved gases in a gaseous or liquid measurement medium, are of great importance. These measured variables can be acquired and/or monitored for example by means of electrochemical sensors, such as optical, potentiometric, amperometric, voltametric, or coulometric sensors, or also conductivity sensors.

These sensors are supplied with energy and data for example via a cable and an inductive interface. If these sensors are operated in a potentially explosive environment, these sensors, as well as the cable and the inductive interface, must correspond to special criteria for this environment, in particular be intrinsically safe. In this case, for example, a maximum voltage at the device connections must not be exceeded. In some embodiments, however, circuit parts may exist which have a higher voltage level than at the device connections, as long as these circuit parts are encapsulated and/or there is no possibility that this high voltage level reaches the device connections.

Since a galvanically isolated encapsulation of these higher voltage levels is generally difficult to achieve, the voltage is usually limited in the direction of the device connections. However, this requires limiting measures on each individual device connection pole, except for a reference connection. A limitation of the voltage that may arise due to feedback from the inductive interface to the wire of the cable, which supplies the inductive interface or the sensor with energy, must also be prevented.

Such a limitation of the feedback can be achieved with a particularly large limiting resistor. However, this has the disadvantage that significant energy losses during normal operation are caused by this limiting resistor. Furthermore, the limiting resistor must be dimensioned such that a current that is sufficient for supplying energy to the sensor can flow therethrough. The dimensioning of the limiting resistor thus leads to a not insignificant space requirement in the inductive interface.

SUMMARY

It is therefore an object of the present disclosure to propose a circuit which makes it possible to limit feedback in such a way that energy losses in normal operation are minimized, with a minimal space requirement.

This object is achieved according to the present disclosure by the regenerative limiting circuit for potentially explosive areas, for supplying energy to a sensor and for data communication with a sensor.

The regenerative limiting circuit according to the present disclosure has an input unit, a first limiting unit, a second limiting unit, a monitoring unit, a high-voltage unit, a node unit, and a reference potential, the input unit having at least one first data line connection, a second data line connection, a supply line connection, and a zero line connection, in each case for connecting a connection cable, the first limiting unit being connected to the first data line connection, the second limiting unit being connected to the second data line connection, and in each case having a resistor and a Zener diode, the Zener diode being connected in each case such that the Zener diode connects through to the reference potential in the case of overvoltage, the monitoring unit being connected to the first limiting unit and the second limiting unit and being suitable for evaluating data, the high voltage unit having a transformer, an energy input, a control input connected to the monitoring unit, and an output connected to the transformer, the output having a coil for the inductive transmission of energy and data, the node unit being connected to the supply line connection, the monitoring unit, and the energy input, and being at a distance of at least 0.5 mm from these, and the node unit having an electrically conductive surface area of at least 4 square millimeters.

The regenerative limiting circuit according to the present disclosure makes it possible for an optimal limitation of feedback to be achieved with a minimal space expenditure. In addition, the circuit means that no large components, such as resistors, are required.

According to one embodiment of the present disclosure, a first resistor of at least 50 ohms is arranged between the node unit and the energy input.

According to one embodiment of the present disclosure, a second resistor of at least 50 ohms is arranged between the node unit and the monitoring unit.

According to a further embodiment of the present disclosure, the node unit represents the only location on line branches between the supply line connection and the energy input.

According to one embodiment of the present disclosure, all connecting branches which
connect the node unit to the supply line connection, the monitoring unit, and the energy input are at an angle of at least 90° relative to one another.

According to one embodiment of the present disclosure, the node unit is protected by a potting layer.

According to one embodiment of the present disclosure, the node unit comprises copper and is circular.

BRIEF DESCRIPTION OF THE DRAWINGS

The present disclosure is explained in more detail on the basis of the following description of the figures. In the figures.

DETAILED DESCRIPTION

The regenerative limiting circuit 1 according to the present disclosure is designed in particular for use in potentially explosive areas. The regenerative limiting circuit 1 is suitable for supplying energy to a sensor which is inductively coupled to the regenerative limiting circuit 1, and for exchanging data with said sensor.

Figure 1:
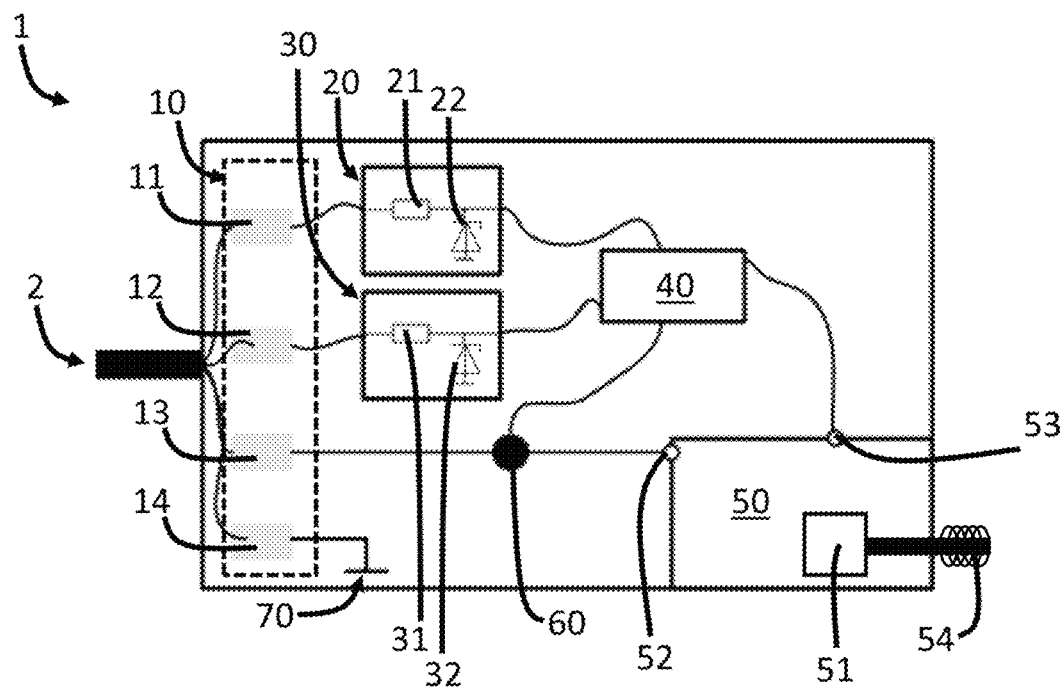
FIG. 1 shows the regenerative limiting circuit according to the present disclosure.
Figure 2:
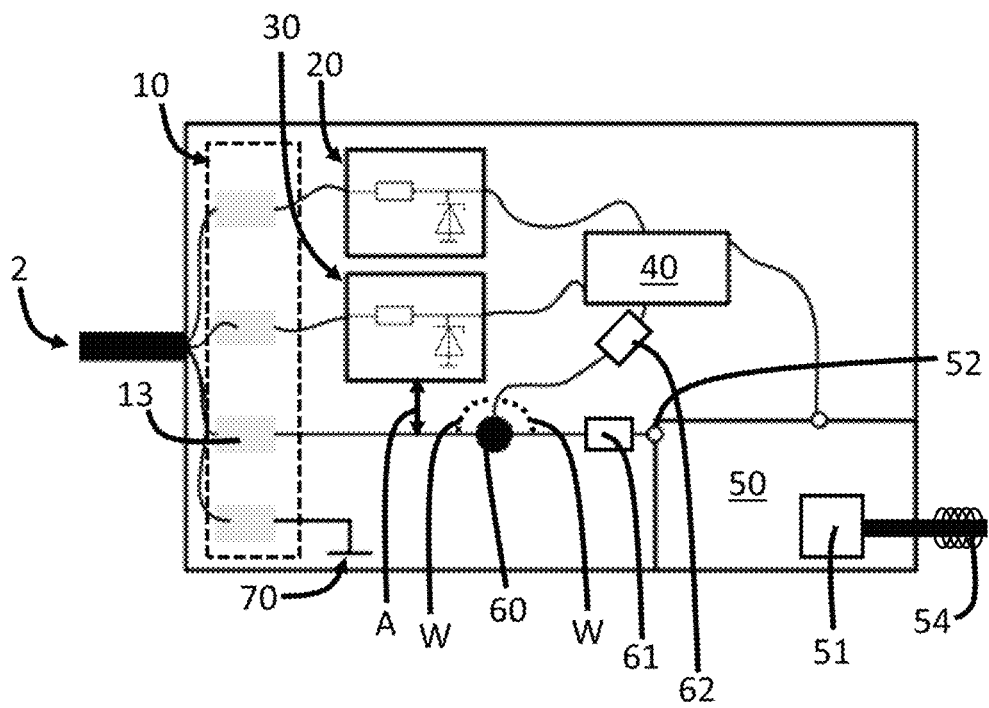
FIG. 2 shows an alternative embodiment of the circuit shown in FIG. 1.

As shown in FIG. 1 and FIG. 2, the regenerative limiting circuit 1 has an input unit 10, a first limiting unit 20, a second limiting unit 30, a monitoring unit 40, a high-voltage unit 50, a node unit 60, and a reference potential 70.

The input unit 10 comprises at least one first data line connection 11, a second data line connection 12, a supply line connection 13, and a zero line connection 14, in each case for connecting a connection cable 2. The connection cable 2 has four wires, two wires being used as data lines, one wire being used as a power supply line, and one wire being used as a zero conductor.

The first limiting unit 20 is connected to the first data line connection 11, the second limiting unit 30 is connected to the second data line connection 12. The first limiting unit 20 and the second limiting unit 30 each have a resistor 21, 31 and a Zener diode 22, 32. The resistor 21 and the resistor 31 have, for example, an ohmic resistance of 1 kOhm. The Zener diode 22, 32 is in each case connected in such a way that the Zener diode 22, 32 connects through to the reference potential 70 in each case, in the event of an overvoltage. The Zener diode connects through to the reference potential 70, for example at an overvoltage of 5 V. This prevents an overvoltage from being fed back into the wires of the connection cable 2, i.e. into the data lines, in the event of a problem. The reference potential 70 is, for example, connected to ground. The regenerative limiting circuit 1 is preferably connected to the reference potential, for example ground.

The monitoring unit 40 is connected to the first limiting unit 20 and the second limiting unit 30, and is suitable for evaluating data. The monitoring unit 40 is suitable for processing the data received at the first data line connection 11 and the second data line connection 12, and for forwarding these data to the sensor via the inductive interface. The monitoring unit 40 is suitable for modulating data transmitted to the sensor to the energy signal. The monitoring unit 40 is also suitable for processing the data received via the inductive interface, and for forwarding these data to the connection cable 2 via the first data line connection 11 and the second data line connection 12.

The high-voltage unit 50 has a transformer 51, an energy input 52 connected to the supply line connection 13, a control input 53 connected to the monitoring unit 40, and an output 54 connected to the transformer 51. The output 54 comprises or is a coil for the inductive transmission of energy and data. The output 54 represents the inductive interface with the sensor.

The node unit 60 is connected to the supply line connection 13, the monitoring unit 40 and the energy input 52. The node unit 60 is at a distance A of at least 0.5 mm from the supply line connection 13, the monitoring unit 40, and the energy input 52. Preferably, the node unit 60 is at the distance A from all electronic components of the regenerative limiting circuit 1. In particular, the connection branch between the supply line connection 13 and the node unit 60 is also at the distance A from all components of the regenerative limiting circuit 1, except, of course, the supply line connection 13 and the node unit 60 itself (see FIG. 2). The distance A prevents the node unit 60 being "jumped over" by voltage spikes. The node unit 60 has an electrically conductive surface area of at least 4 square millimeters. The node unit 60 preferably has a conductor track width of 2 mm.

According to one embodiment of the present disclosure, which is shown in FIG. 2 and which is compatible with all the embodiments described, a first resistor 61 of, for example, 50 ohms is arranged between the node unit 60 and the energy input 52. The first resistor 61 allows the regenerative limiting circuit 1, in particular the supply line connection 13, to be protected against feedback. The first resistor 61 thus achieves spatial separation in a defined manner, via the first resistor 61, between a voltage possibly fed back from the high-voltage unit 50, and the node unit 60.

As shown in FIG. 2, a second resistor 62 of, for example, 50 ohms is arranged between the node unit 60 and the monitoring unit 40.

Preferably, the node unit 60 represents the only location on line branches, or at least the last branching point upstream of the supply line connection 13. This has the advantage that, in addition to this connection to the supply line connection 13, there are no parallel paths which would represent a bypass of the feedback prevention means.

The second resistor 62 allows the regenerative limiting circuit 1, in particular the supply line connection 13, to be protected against feedback. The second resistor 62 thus achieves spatial separation in a defined manner, via the second resistor 62, between a voltage possibly fed back from the monitoring unit 40, and the node unit 60.

As also shown in FIG. 2, all connecting branches which are connected directly to the node unit 60, i.e. the line to the supply line connection 13, the line to the monitoring unit 40, and the line to the energy input 52, are at an angle of at least 90° relative to one another. The lines are preferably designed as conducting tracks. The regenerative limiting circuit 1 is preferably implemented on a circuit board, for example a multi-layer circuit board.

According to one embodiment of the present disclosure, which is compatible with all the embodiments described, the node unit 60 is protected by a potting layer. Preferably, the line portion between the node unit 60 and the supply line connection 13 is also protected by a potting layer. This prevents the possibility, in the event of voltage peaks, of "jumping over" taking place on this line portion, or the necessary distances between line portions of the node unit and line portions of networks from other regions can thereby be reduced.

The node unit 60 preferably comprises copper or other highly conductive materials. The node unit 60 is preferably circular, or has a hexagonal shape.

The node unit 60 makes it possible that, when a high voltage is fed back from the high-voltage unit 50 in the direction of the supply line connection 13, by virtue of the node point this voltage does not pass through as far as the supply line connection 13, but immediately drops.

The invention claimed is:

1. A regenerative limiting circuit for potentially explosive areas, for supplying energy via an inductive interface and for data communication via the inductive interface, the regenerative limiting circuit comprising:
   an input unit having a first data line connection, a second data line connection, a supply line connection, and a zero line connection, each for connecting a connection cable;
   a first limiting unit;
   a second limiting unit;
   a monitoring unit;

a high-voltage unit having a transformer, an energy input, a control input connected to the monitoring unit, and an output connected to the transformer;

a node unit; and a reference potential, wherein the first limiting unit is connected to the first data line connection and the second limiting unit is connected to the second data line connection, wherein each of the first limiting unit and the second limiting unit has a resistor and a Zener diode, wherein the Zener diode is connected in each case such that the respective Zener diode connects through to the reference potential in the event of an overvoltage, wherein the monitoring unit is connected to the first limiting unit and the second limiting unit and is suitable for evaluating data, wherein the output of the high-voltage unit is the inductive interface having a coil for inductively transmitting the energy and for the data communication, and wherein the node unit is connected to the supply line connection, the monitoring unit, and the energy input, and is in each case at a distance of at least 0.5 mm from these, and the node unit has an electrically conductive surface area of at least 4 square millimeters.

2. The regenerative limiting circuit according to claim 1, wherein a first resistor of at least 50 ohms is arranged between the node unit and the energy input.

3. The regenerative limiting circuit according to claim 1, wherein a second resistor of at least 50 ohms is arranged between the node unit and the monitoring unit.

4. The regenerative limiting circuit according to claim 1, wherein the node unit represents a single location on line branches between the supply line connection and the energy input.

5. The regenerative limiting circuit according to claim 1, wherein all connecting branches which connect the node unit to the supply line connection, the monitoring unit, and the energy input are at an angle of at least 90° relative to one another.

6. The regenerative limiting circuit according to claim 1, wherein the node unit is protected by a potting layer.

7. The regenerative limiting circuit according to claim 1, wherein the node unit includes copper and is circular.

* * * * *